C. BARKER.

Grain Car Doors.

No. 5,671. Reissued Dec. 2, 1873.

WITNESSES.
P. C. Dieterich.
G. Kiesewetter.

INVENTOR,
Charles Barker.
per
C. H. Watson & Co
ATTORNEYS.

AM. PHOTO-LITHOGRAPHIC CO. N.Y. (OSBORNE'S PROCESS)

UNITED STATES PATENT OFFICE.

CHARLES BARKER, OF MAQUON, ILLINOIS, ASSIGNOR TO HIMSELF AND THOMAS C. THOMAS, OF SAME PLACE.

IMPROVEMENT IN GRAIN-CAR DOORS.

Specification forming part of Letters Patent No. 103,126, dated May 17, 1870; antedated May 13, 1870; reissue No. 5,206, dated December 31, 1872; reissue No. 5,671, dated December 2, 1873; application filed November 12, 1873.

*To all whom it may concern:*

Be it known that I, CHARLES BARKER, of Maquon, in the county of Knox and State of Illinois, have invented certain new and useful Improvements in Doors for Railroad Box-Cars; and I do hereby declare the following to be a full, clear, and exact description thereof, reference being had to the accompanying drawing and to the letters of reference marked thereon.

The nature of my invention consists in a door for railroad-cars, arranged to turn edgewise upon a pivot, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
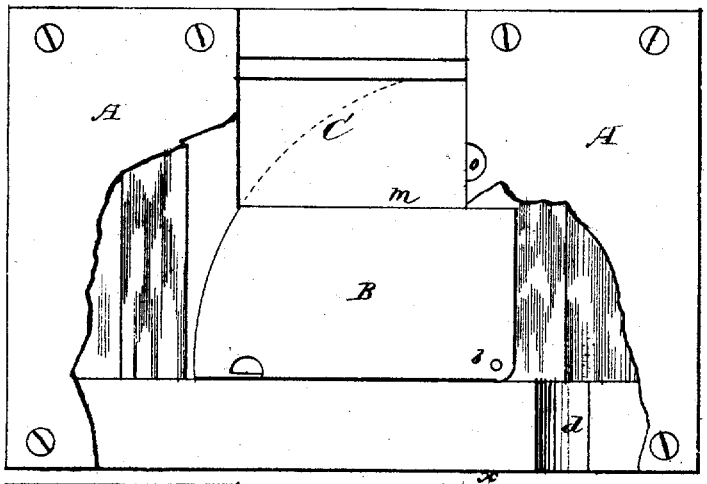
Figure 4:
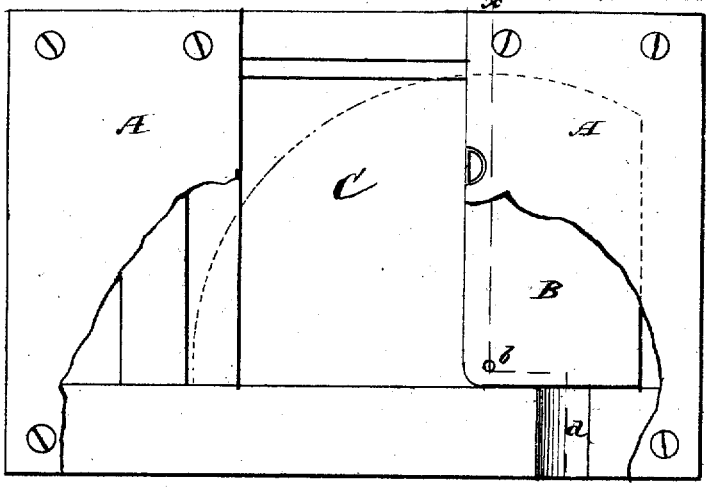
Figure 3:
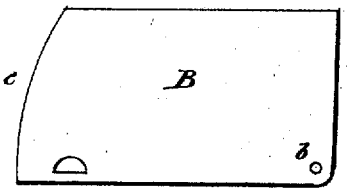
Figure 2:
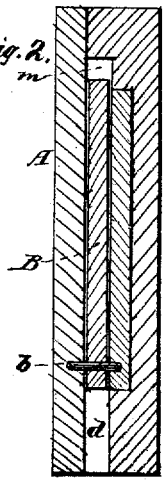

Figure 1 is a front view of my improved door, showing the same closed. Fig. 2 is a transverse vertical section of the same through the line *x x*, Fig. 4. Fig. 3 is a view of the door detached from the car; and Fig. 4 is a front view of my improved car-door, showing the same thrown open.

A represents the side of a box-car, such as are used for the transportation of grain, constructed in any of the known and usual ways. C is the opening or doorway in the car, and on each side of the said doorway is made a groove, *m*, of sufficient width to allow of the door B moving freely in the same. The door B is pivoted in one of these grooves at *b*, and the other end of the door is made curved or inclined, as shown, so that the corners at the opposite or outer end of the door will be an equal distance from the pivot.

This peculiar shape enables the door, when partially thrown up, to retain its hold in the groove *m*, and withstand the outward pressure of the grain.

The movement of the door B upon its pivot is edgewise both in opening and closing. When the door is thrown open, the outer edge of the door will be parallel, or nearly so, to the side of the door-frame, and flush, or nearly flush, with the same, as shown in Fig. 4. When the door is closed down, as shown in Fig. 1, it fits snugly in the grooves *m m*, so as not to let the grain enter them.

In the frame of the car, in rear of the door B, is an opening or passage, *d*, for the escape of any grain which may enter the groove or opening receiving the door when thrown up, thus securing at all times a free motion of the door. The inside of the section of the car in which the door is placed is completely covered by a lining, fitting so closely that grain cannot enter the grooves *m* when the door plays. *o* represents a semicircular space cut away from the wall of the car, through which to reach the door B when it is open and required to be closed.

Having thus fully described my invention, what I claim as new, and desire to secure by Letters Patent, is—

1. In combination with a railroad-car, a door arranged to turn edgewise across the opening C, substantially as and for the purpose specified.

2. The opening *d* in the frame of a railroad-car, in rear of the door, for the purposes set forth.

3. A pivoted door for railroad-cars, with the outer points of the door equidistant from the pivot on which it turns, substantially as and for the purposes herein set forth.

4. The car A, pivoted door B, grooves *m*, and opening *d*, all constructed and arranged as and for the purpose set forth.

CHARLES BARKER.

Witnesses:
W. H. ROBINSON,
ROBERT DOLLAND.